Nov. 29, 1955  R. KAGAN ET AL  2,725,103
BIAS CUTTING AND WIND-UP MECHANISM
Filed Aug. 3, 1951  5 Sheets-Sheet 2

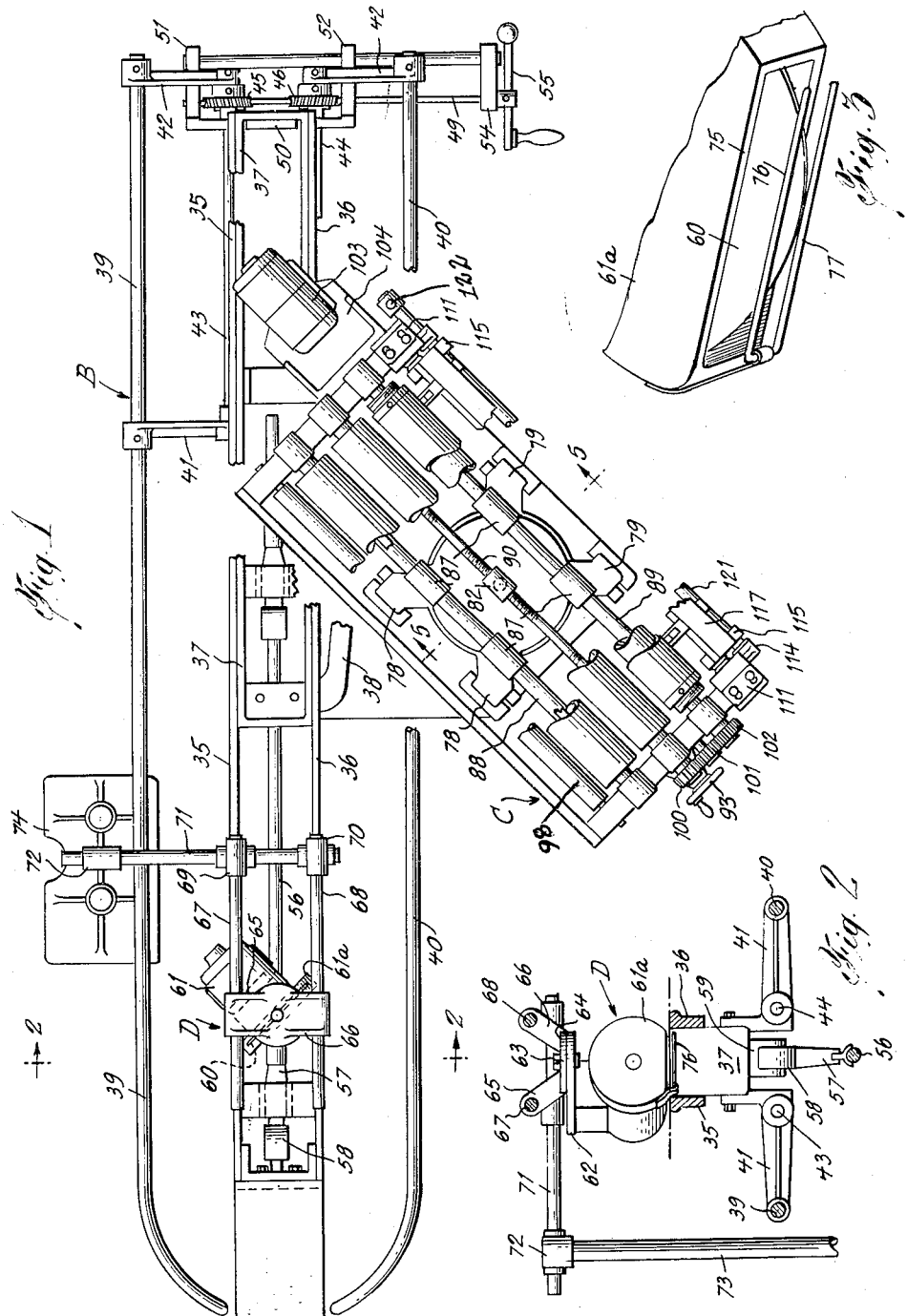

INVENTOR.
Ralph Kagan.
Harry Gerstein.
Frank Gerstein.
BY
Robert J Hulsizer
atty

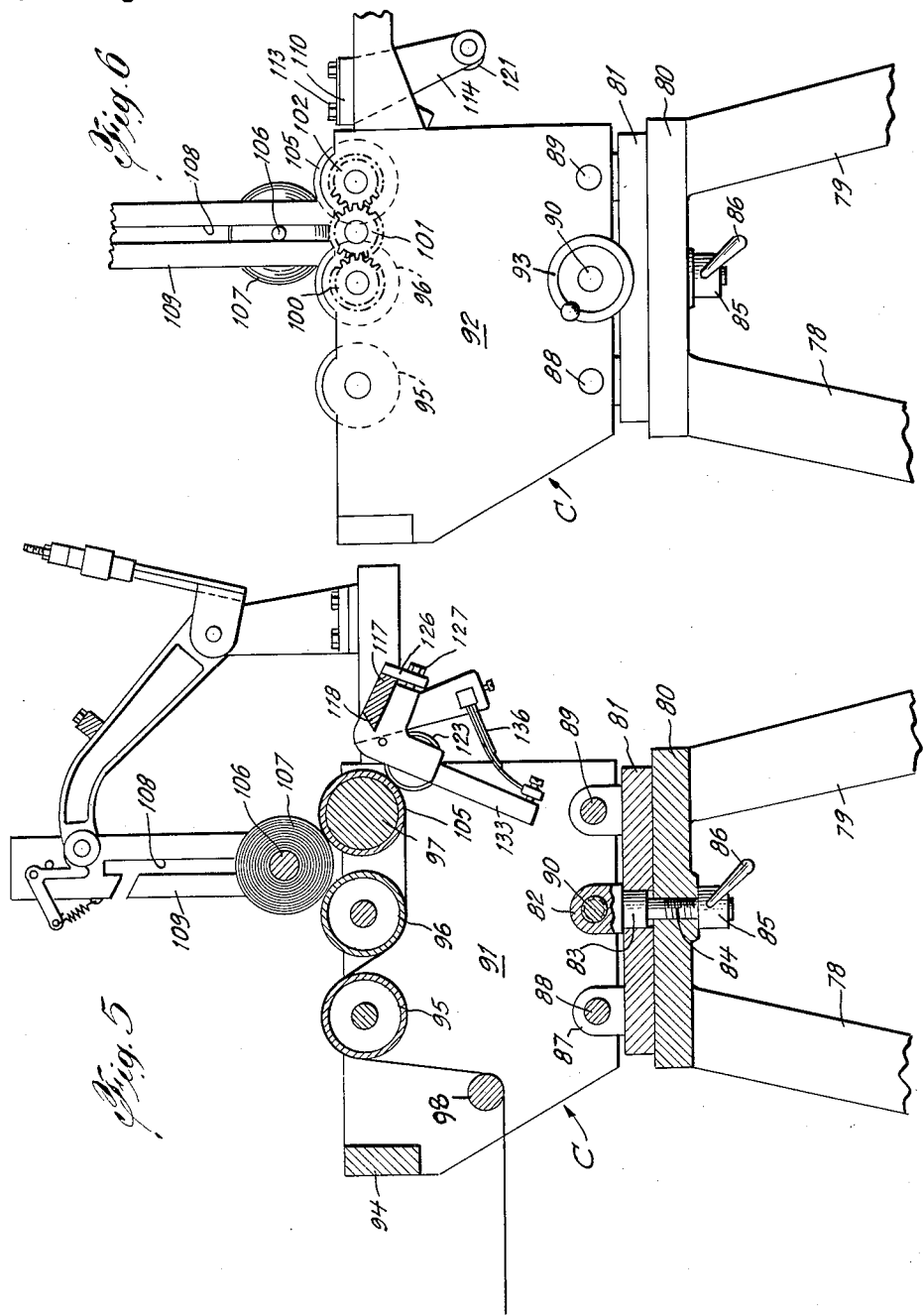

Nov. 29, 1955  R. KAGAN ET AL  2,725,103
BIAS CUTTING AND WIND-UP MECHANISM
Filed Aug. 3, 1951  5 Sheets-Sheet 4
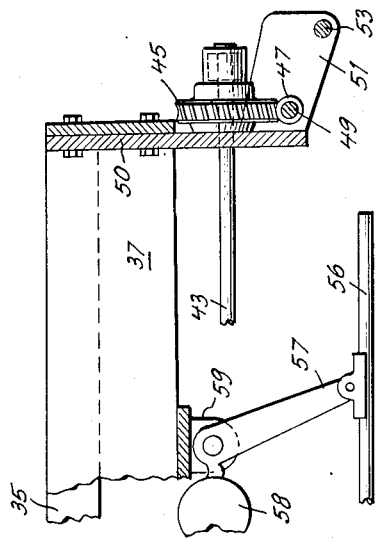
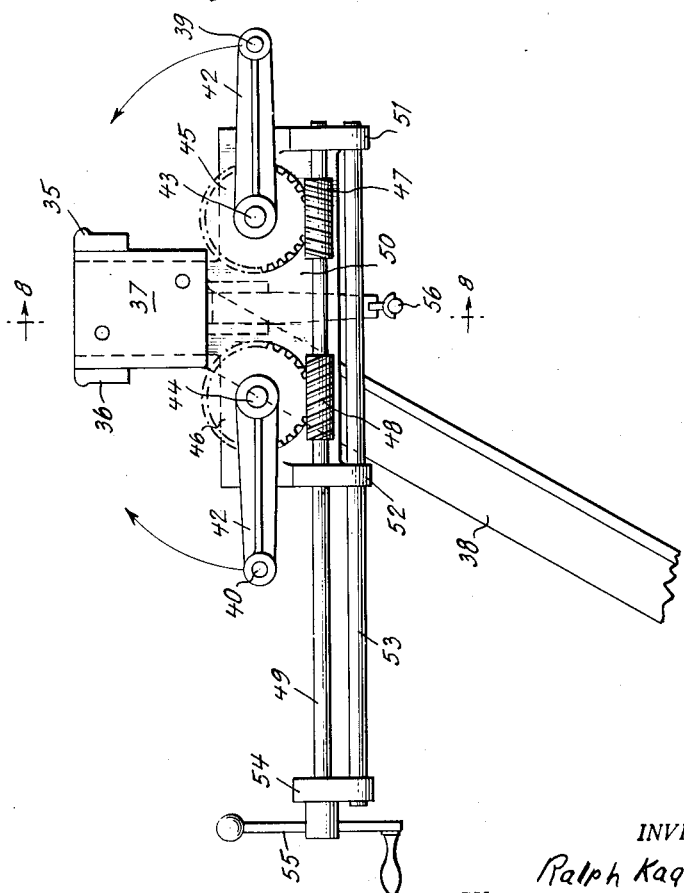
INVENTOR.
Ralph Kagan.
Harry Gerstein.
Frank Gerstein.
BY
Robert J. Hulsizer atty

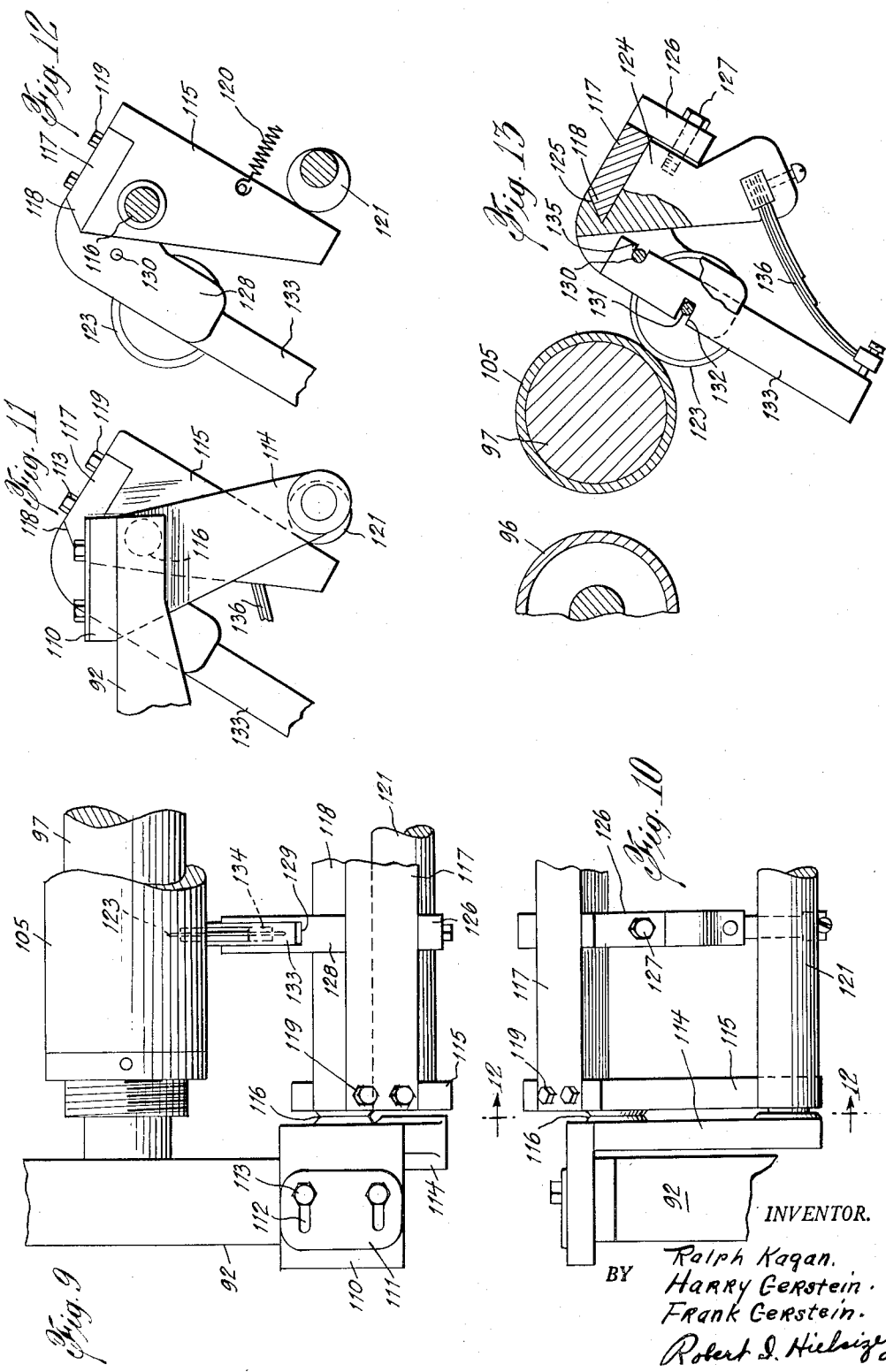

United States Patent Office
2,725,103
Patented Nov. 29, 1955

2,725,103

BIAS CUTTING AND WIND-UP MECHANISM

Ralph Kagan, Brooklyn, and Harry Gerstein, Roslyn, N. Y., and Frank Gerstein, Paterson, N. J., assignors to Lever Bias Machine Corporation, New York, N. Y., a corporation of New York Application August 3, 1951, Serial No. 240,206

9 Claims. (Cl. 164—65)

This invention relates to improvements in bias cutting and wind-up mechanism and has to do with improvements on certain apparatus which is set forth in patents of the United States hereinafter mentioned.

In previous machines of this general nature material has been sewn into tubular form placed on a rotatable support and then passed over a mandrel where it has been cut on the bias and then wound up into rolls. In these former machines it has always been necessary to have an operator manipulate the rotatable support for the tubular material to keep this support rotating in synchronism with the angular movement of the material around the mandrel where it is cut on the bias.

It is an object of this invention to provide a machine in which the material may be placed on the rotatable support and initially threaded or fed into the mandrel and wind-up device to get it started and, after certain preliminary adjustments are made, the machine will run automatically without any manual assistance or guidance and will cut and wind up thousands of yards of material without the need of an operator.

It is also an object of the invention to provide a slitting means on the wind-up unit to slit the roll of bias-cut material into disks or rolls of smaller width as desired and to do this without also the attention of an operator.

It is a further object of the invention to provide a wind-up frame which can be adjusted easily and readily with respect to its angular relation to the mandrel from which it receives the goods so that as the mandrel receives goods of differing widths the wind-up frame may be adjusted accordingly.

It is still another object of the invention to provide a bias cutting knife so supported on its pedestal and with relation to the mandrel that it can be adjusted in a variety of manners with respect to the mandrel and with respect to the wind-up mechanism.

Further and more specific objects, features, and advantages will more clearly appear from a consideration of the specification hereinafter set forth especially when taken in connection with the accompanying drawings which illustrate a present preferred form which the invention may assume.

In general the invention includes a rotatable turntable supporting a container in which is disposed tubular material which is to be cut on the bias. This turntable is driven by a motor of constant speed but there is interposed a variable speed transmission device between the motor and the table which permits the rotation of the table to be regulated at will. The table is preferably sloped to partially face the adjacent end of a mandrel.

This mandrel has adjustable bars to permit the periphery of the mandrel to alter for different widths of goods and the material is passed on to and around the mandrel in a spiral manner. The mandrel is related to a bias cutting knife which is disposed above it and is mounted on a support and so constructed that it may swing around a vertical axis on its support to alter its angle with respect to the goods since the knife blade is in a vertical plane and also can be adjusted to move the whole knife along its support longitudinally and transversely of the mandrel.

The wind-up frame is supported on a pedestal adjacent the mandrel and can be swung around its support to alter the general angle of the frame with respect to the mandrel from which it receives the goods. If the goods are of one width the angle of the mandrel will be of one value and if the width of the goods is different then the angle of the frame may be changed as desired.

The frame may also be adjusted on its support to be slid laterally so as to relate the slitting knives thereon and the rollers properly with respect to the received goods. The frame also may be swung from a position almost parallel to the bars on the mandrel to one practically at right angles to the mandrel bars. In this latter position the wind-up frame may be used to wind up material without passing it across the mandrel and without cutting it on the bias. In other words this wind-up can be used in this adjusted position to wind up any material.

Also disposed on the wind-up frame are a plurality of slitting knives. These are mounted on a pivoted knife support and are individually adjustable thereon to determine the widths of the disks into which the wound-up rolls are to be slit. The knives preferably are disposed adjacent one of the wind-up rollers and contact it upwardly along a line thereon below the horizontal axis of the roller. The knives are pressed against the roller by cam action and are released automatically by spring action when the cam is released.

The adjustment of the angle of wind-up frame with respect to the mandrel has to do with the width of the goods being cut and the position of the knife along the mandrel also has to do with the width of the goods since it is always desired that the cut edge of the material as it leaves the knife will always enter the wind-up frame along the same line to avoid any resetting of the knives for any particular slitting arrangement for which the knives are set.

The present preferred form which the invention may assume is illustrated in the drawings, of which, Fig. 1 is a plan view of the adjustable mandrel and material-wind-up units of the machine;

Fig. 2 is a vertical cross section taken on the line 2—2 of Fig. 1 and showing the cutting knife and support;

Fig. 3 is a perspective partial detail of the guard bars on the cutting knife casing;

Fig. 5 is a vertical cross section taken on the line 5—5 of Fig. 1 and showing some details of the wind-up structure;

Fig. 6 is an end elevation of the wind-up device;

Fig. 7 is an end elevation of the mechanism for adjusting the mandrel bars viewed from the right of Fig. 1;

Fig. 8 is a vertical longitudinal partial section taken on the line 8—8 of Fig. 7;

Fig. 9 is a partial plan view of the arrangement and support of the slitting knives on the wind-up device;

Fig. 10 is a partial end elevation of the structure shown in Fig. 9;

Fig. 11 is a partial end elevation of the structure shown in Fig. 9 as viewed from the left side of Fig. 9;

Fig. 12 is a vertical longitudinal cross section taken on the line 12—12 of Fig. 10; and, Fig. 13 is an enlarged sectional view of some of the elements shown in Fig. 5 relative to the slitting knives and their adjustment and support.

Figure 4:
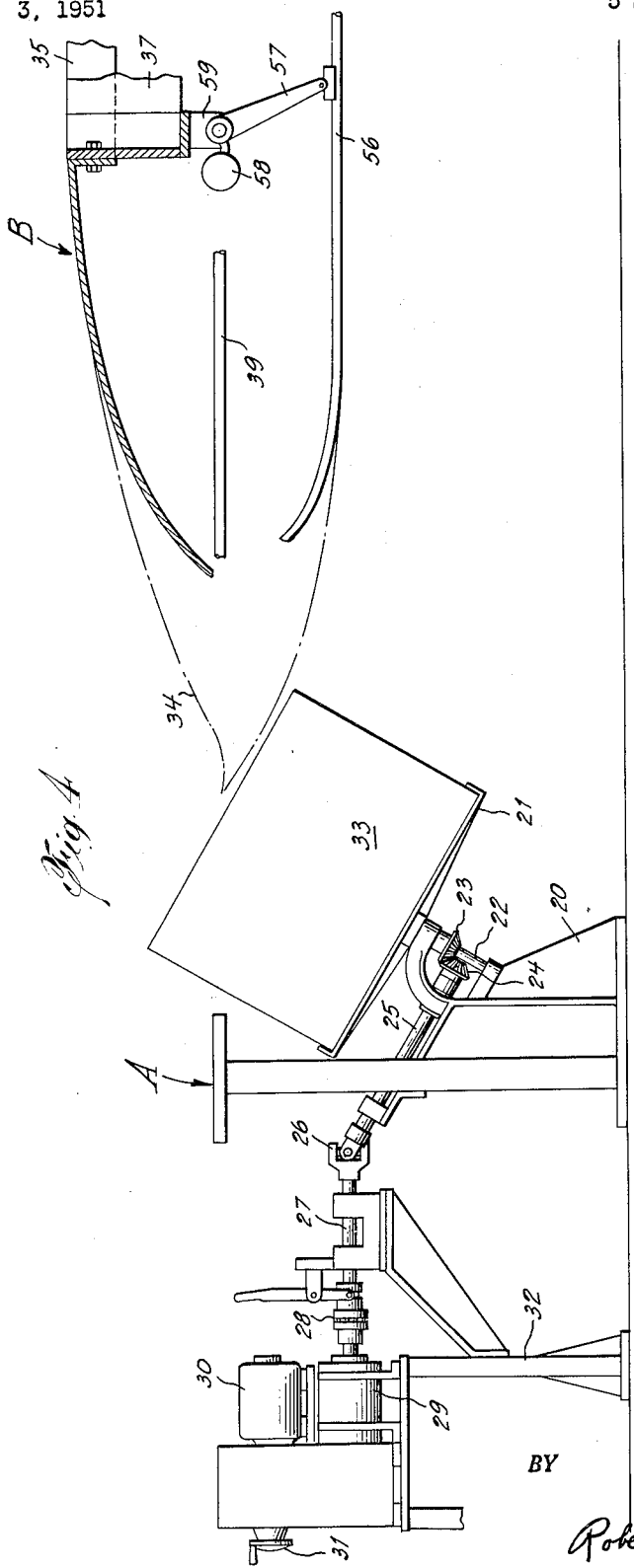
Fig. 4 is a side elevation of the end of the mandrel and the rotatable material turntable with its drive.

Referring now merely to the present preferred form of the invention as shown in the drawings, it is to be noted that the machine as a whole comprises a rotatable turntable material-supporting unit generally indicated by the letter A; an expansible mandrel B; a wind-up unit C including a slitting mechanism thereon; and an adjustable cutting knife unit D disposed above the mandrel.

Turn-table unit

This comprises a pedestal 20, on which is rotatably supported a turntable plate 21 rotatable about an axis inclined toward the adjacent end of the mandrel. This general type of table is shown in U. S. Patent No. 2,350,027 issued May 30, 1944. The shaft 22 of the plate 21 is connected by bevel gears 23 and 24 to a drive shaft 25 connected to a universal coupling 26 connected to a stub shaft 27 connected to a clutch 28 which connects the clutch to a variable transmission mechanism 29 of the Reeve's drive type driven by a motor 30 which is a constant speed motor. A regulating device for adjusting the ratio of the drive in the usual manner is shown by handle 31 on the transmission casing. The motor 30 and drive 29 and associated parts are mounted on pedestal frame 32. On the plate 21 is disposed in any suitable manner a box 33 containing material 34 which has been previously sewn into tubular form and which is adapted to be drawn out of the box and over and around the mandrel in the manner shown in the above mentioned patent. The speed of rotation of the plate 21 is synchronized with respect to the speed of movement of the material across and around the mandrel under the drive of a motor on the wind-up device which is to be described hereinafter. By this synchronization the tubular material is pulled out of the box and passed around the mandrel without the need of an operator to stand at unit A and manually turn the table as shown in the above mentioned patent. If the angular turning movement of the material around the mandrel is altered, as will occur when different widths of material are used, then the handle 31 of the Reeve's drive may be manipulated to change the turning speed of the table to accord with it.

The mandrel unit

The mandrel employed is somewhat the same in general construction and operation as the one shown in U. S Patent No. 2,128,481 issued August 30, 1938, and is formed of two spaced parallel top bars or rods 35 and 36 which are held spaced apart by a rectangular frame member 37 the ends of which are supported from the floor by any suitable means such as legs 38. The mandrel is also formed by adjustable side bars 39 and 40. These extend along parallel to the bars 35 and 36 but normally below and to the side of the same and each are supported on pairs of swinging arms 41, 42. These pairs of arms are connected to shafts 43 and 44 respectively. On these two operating shafts are worm gears 45 and 46 adapted to mesh with worms 47 and 48 respectively mounted on an operating shaft 49. The shafts 43, 44, and 49 are suitably supported on a bracket 50 fastened to one end of the frame member 37 as shown in Fig. 8. The bracket has offset end plates 51 and 52 which act as bearings for shaft 49. A bar 53 is supported by plates 51 and 52 and extends beyond the plate 52 as shown in Fig. 7 to support a plate 54 fixed thereon and acting to support the outer end of the operating shaft 49. The outer end of the shaft 49 has an operating handle 55 so that as it is turned the shaft 49 is rotated and the worms 47 and 48 operated to rotate the worm gears 45 and 46 and thus position synchronously the side mandrel bars 39 and 40. The mandrel also has a bottom bar 56 which at spaced points is connected to pivoted arms 57 which are balanced by a counterweight 58 in the manner and for the reasons indicated in the last mentioned U. S. patent. The arms 57 and weights 58 are pivotally connected to bracket members 59 fastened to the underside of the frame member 37 as seen in Fig. 8. This gravity operated bar will therefore tend at all times to exert pressure on the material which is passing around it and maintain the material smooth and even while it is being cut. By the adjustment of the side bars 39 and 40 the periphery of the mandrel may be adapted for different widths of tubes to be cut into bias material.

Bias cutting knife unit

Figs. 1, 2, and 3 also show the structure and manner of adjusting the bias cutting knife above the mandrel. The knife 60 and motor 61 are supported from a flat plate 62 which by means of bolt 63 can be adjusted with respect to a fixed plate 64 which in turn is connected by apertured arms 65 and 66 to longitudinally extending bars 67 and 68. These bars 67 and 68 are slidable in collars 69 and 70 which are also bored to receive a shaft 71 extending into a collar 72 on the upper end of a post 73 the bottom of which is connected to the floor plate 74. In this manner the knife 60 may be angularly adjusted on its supporting plate 64 by loosening the bolt 63. It also may be slid along the bars 67 and 68 by its support and may be adjusted transversely of the mandrel bars by adjusting the collar members 69 and 70 along the horizontal shaft 71 if desired. In Fig. 3 particularly there is shown the lower face of the casing 61a which is open and across this opening and slightly below the plane of the lower edge 75 of the casing there are disposed a pair of parallel spaced elongated guard wires 76 and 77 running parallel to and on opposite sides of the knife 60 as shown. As shown in Fig. 2 the level of these wires is slightly below the tops of the upper fixed parallel mandrel bars 35 and 36 and the fabric in passing over the tops of these bars has to be passed under the guide wires so that it is under proper tension of the bars thereon to permit the knife to produce a smooth and even and regular cut.

Wind-up unit

This unit is illustrated in Figs. 1, 5, and 6 and is of the general form and operation shown in U. S. Patent No. 2,110,856 issued March 15, 1938, except for several improvements in structure and operation. As shown, the unit is mounted on legs 78, 79 connected at their upper ends to a fixed stationary plate 80. On top of the plate 80 is a rotatable plate 81. A bored collar 82 rests on top of plate 81 and has a stem 83 dependent therefrom into a bore in the plate 81 and below the stem 83 is an integral threaded portion 84 which extends through an alined bore in the fixed plate 80 and the lower end of this threaded portion is engaged by a threaded nut 85 having an operating handle 86 thereon. By tightening up on the nut 85 the two plates 80 and 81 may be held tightly in any adjusted position and by loosening up on the nut the plate 81 may be turned around at any angle desired with respect to the fixed plate 80.

Bored lugs such as 87 project upwardly from the top of the plate 81. There are four of these lugs as shown in Fig. 1 and in pairs they receive bars 88 and 89. Bars 88 and 89 are slidably received in lugs 87. The bored collar 82 is interiorly threaded and receives a threaded shaft 90. The opposite ends of bars 88 and 89 are fixed in any suitable manner in end frame plates 91 and 92 and the ends of shaft 90 are suitably journalled in said end plates to permit it to be turned by means of an operating rotatable disk or handle 93 shown in Fig. 6. The end frame members 91 and 92 are at their tops conected by a longitudinally extending plate 94. It will be clear that the frame members or unit formed by plates 91, 92, and 94, the bars 88 and 89, and shaft 90 may be swung around the vertical axis of bolt 84 when desired so that this unit may be disposed to lie with the bars 88 and 89 practically parallel to the mandrel bars or may be swung at right angles to the mandrel so that the bars 88 and 89 will be disposed practically at right angles to the mandrel bars. The unit formed by plates 91, 92, etc. can be rotated about the vertical axis of bolt 84 by first turning nut 85 through means of handle 86 so as to loosen its connection to the threaded portion 84 of collar 82. With the latter connection loosened plate 81 can be located relative to plate 80. When the unit is in its proper location the nut 85 can be tightened to fix the position of the frame members or unit formed by plates 91, 92, etc.

The unit formed by the plates 91, 92, etc. can be moved longitudinally by the simple procedure of rotating disk or handle 93. Rotation of disk 93 will in turn cause rotation of shaft 90. Since the latter is threadingly connected to collar 82, shaft 90 will advance through collar 82 in one direction or the other parallel to its longitudinal axis, depending on the direction of rotation of handle 93. Bars 88 and 89 will in turn slide in lugs 87 as shaft 90 advances through collar 82.

Between the end plates 91 and 92 of the wind-up unit, material-contacting or wind-up rollers 95, 96, and 97 extend as shown in Figs. 1 and 5. The fabric after being cut on the bias leaves the mandrel and passes into contact with guide bars or idler rollers 98 and 95 and then around the wind-up rollers. Rollers 96 and 97 are driven by means of meshing gears 100, 101, and 102 and the other end of the shaft of one of the rollers is connected to a drive motor 103 (Fig. 1) supported on a platform 104 connected to the wind-up frame. The roller 97 is provided with a hardened steel outer covering sleeve 105 because of its association with certain slitting knives hereinafter described. The wound-up material, whether whole or slitted, is wound up on a core 106 and is indicated by the numeral 107. The ends of the core 106 ride in slots 108 in vertical side bars 109 as shown and described in the above mentioned patent. The roll of wound-up material rests by gravity upon the two adjacent wind-up rollers 96 and 97.

Slitting knife unit

This unit is shown in Figs. 9 to 13 and the knives are related to the steel covered roller 97 above mentioned, and are supported in relation to the end plates 91 and 92 of the wind-up frame. In Figs. 9 and 10 is shown the manner of supporting the knives at one side of the frame, the other end of the slitting unit being similarly supported. A support bracket has a flat portion 110 resting on top of the end plate 92 and is apertured and provided with a metal wear plate 111 with slots 112 therein to receive bolts 113 extending up from the top of plate 92, to permit adjustment of the plate 110 on top of the end plate 92. The bracket has an integral dependent plate 114. A knife supporting frame is disposed and pivotally supported between the two dependent plates 114 and comprises vertical plates 115 disposed parallel to and adjacent to said dependent plates 114. These plates 115 are pivotally supported near their tops as at 116 to the dependent plates 114 and are connected at their tops by a horizontally extending connecting bar 117. The tops of plates 115 are recessed to receive the bar 117. The edge of bar 117 on one side is bevelled as at 118 and bolts 119 hold the bar to these plates. The swinging knife-supporting frame formed by the plates 115 and the bar 117 is biased in a retracted position away from the roller 97 by means of springs 120 (Fig. 12) connected to the plates 115 and to any fixed point of the unit.

Extending across between the bottom portions of the dependent plates 114 is an oscillatable cam bar 121 having a handle 122 at one end to permit it to be swung into contact with the lower rear edges of the plates 115 and away from the same as desired. This will permit the knives to be advanced into engagement with the roller 97 as desired and to be withdrawn from such contact by the spring 120 when the cam contact is broken.

Along the top bar 117 may be supported a series of knives such as 123. The knives are supported as follows: A support member or plate 124 is notched at its top and has a rearward bevelled portion 125 to engage the bevelled portion 118 of the bar 117 as clearly shown in Fig. 13. A clamp piece 126 is bolted at 127 to the rear edge of support 124 and the rear edge of bar 117 to hold the support 124 on the bar. The support 124 has a downwardly and forwardly extending integral portion 128 the forward portion of which is slotted as at 129 and is provided with a cross pin 130 in the upper portion of the slot 129. The slot 129 is cut through the support portion 128 to permit the knife to pass. The knife is provided with shaft pins 131 to rest in notches 132 in a knife-supporting bar 133 which is slotted at 134 to receive the knife and its supporting shaft pins 131. The upper rear edge of the bar 133 is provided with a notch 135 to engage the cross pin 130. A compression spring 136 is adjustably disposed between the lower end of support 124 and the lower rear edge of the supporting bar 133 to press this bar and its supported knife into relation to the roller 97 and to permit the knife to move back automatically against the pressure of the spring.

General operation

After a given amount of tubular material is placed in the container on the rotatable table, the material is manually threaded or fed on to the mandrel and on to the wind-up frame until it is engaged by the rollers after which the movement of the goods is without manual control. Depending upon the width of the goods the angle of the wind-up rollers with respect to the mandrel bars is adjusted and the lateral position of the windup frame on its support is regulated as desired to cause the leading edge of the cut material sheet to enter the frame along the same line for the particular setting of the knives if they are being used.

It will be evident that the knives may be used or not as is the requirement of the particular job being performed. The motor to drive the goods around the mandrel and through the wind-up mechanism is of constant speed. As the width of the goods being treated varies, naturally the angular speed of it around the mandrel varies and therefore this requires that the angular speed of the turntable may be varied to be kept in exact synchronism with it. The turning speed of the table varies also when the angle of the wind-up mechanism with relation to the mandrel is changed.

This synchronism is achieved by altering the Reeve's drive speed change device disposed between the motor on the turntable and the turntable itself. If the knives are not to be used the cam bar is operated to release the knives and the springs connected to the knife supporting member will pull it into retracted position.

The wind-up mechanism may be used to wind up material independently of the mandrel by swinging it to a right angle position with respect to the mandrel and then laterally shifting the roller frame as far away from the mandrel as possible in the manner previously described.

While the invention has been described in detail and shown with respect to the accompanying drawings, it is not to be limited to such details and forms, since many changes and modifications may be made in the invention without departing from the spirit and scope thereof. Hence it is desired to cover any and all forms and modifications of the invention which may come within the language and scope of any one or more of the appended claims.

What we claim as our invention, is:

1. In a bias cutting machine for cutting tubular cloth on the bias, a mandrel having a longitudinal axis, a cutting means positioned adjacent said mandrel for cutting cloth as it is pulled spirally over said mandrel, means for pulling cloth over said mandrel and past said cutting means comprising a windup unit, said unit including a windup means having a longitudinal axis extending at an acute angle to the longitudinal axis of said mandrel and comprising means for pulling the tubular cloth spirally over the mandrel, said unit including a frame, means for supporting said unit adjacent said mandrel comprising a base, a pivot means supported by said base, a movable member supported by said base and connected to said frame and supporting said frame on said pivot means so that the wind-up unit is movable along its longitudinal axis and is pivotal about an axis normal to its longitudinal axis and disposed between the ends of the windup means.

2. In a bias cutting machine of the class described, the combination of a rotatable cloth support having variable speed driving means, a mandrel having a longitudinal axis over which tubular cloth is adapted to pass, a knife above the mandrel for cutting the cloth as it is pulled spirally over the mandrel and adjustable angularly and longitudinally with respect to the mandrel, a windup device pivotally supported on a frame adjacent the mandrel, said windup device having a longitudinal axis extending at an acute angle to the longitudinal axis of the mandrel and being slidably adjustable with respect to said mandrel along the longitudinal axis of the windup device, said windup device comprising means for pulling the tubular cloth spirally over said mandrel, and means associated with said windup device to slit the cloth as it winds up on said windup device, said knife being adjustable with respect to said means to slit the cloth.

3. In a bias cutting machine, a mandrel having a longitudinal axis, means for pulling cloth over said mandrel comprising a windup unit, said unit having a windup means thereon including means for pulling the cloth spirally over said mandrel and said windup means having a longitudinal axis extending at an acute angle to the longitudinal axis of said mandrel, said unit including a frame, and means for supporting said frame adjacent said mandrel, said windup means being movably supported on said frame for movement along the longitudinal axis of said windup means, a cutting means for cutting the cloth as it is pulled spirally over the mandrel, said cutting means being positioned adjacent said mandrel.

4. In a bias cutting machine, a rotatable member, means on said member to support a supply of material to be cut, a mandrel having a longitudinal axis, a cutting means on the mandrel for cutting said material as it is pulled spirally over the mandrel, means for pulling said material over said mandrel past said cutting means comprising a windup unit, said unit including a frame and having a longitudinal axis extending at an acute angle to the longitudinal axis of the mandrel, means for supporting said frame adjacent said mandrel comprising a screw connected to said frame, said screw having an axis parallel to the longitudinal axis of said unit, a nut threadably engaged with said screw, a stand, said nut being pivotally supported on said stand and pivotal about an axis transverse to the axis of the mandrel, and means for rotating said screw with respect to said nut to adjust said unit along its longitudinal axis.

5. In a bias cutting machine of the class described, the combination of a rotatable cloth support having a variable speed driving means, a mandrel having a longitudinal axis over which tubular cloth is adapted to pass in a spiral direction, a rotary knife above the mandrel for cutting the cloth as it is pulled spirally over the mandrel and adjustable angularly and longitudinally with respect to the mandrel, a windup device pivotally supported on a frame with the center of the windup device adjacent the mandrel, said windup device having a longitudinal axis extending at an acute angle to the longitudinal axis of the mandrel and comprising means for pulling the tubular cloth spirally over the mandrel, said windup device being slidably adjustable with respect to said mandrel in a horizontal plane along the longitudinal axis of said windup device, and means associated with said windup device to slit the cloth as it winds up on said windup device, the speed of said cloth support being variable to maintain rotational movement of said cloth on said mandrel as the movement of cloth on said mandrel changes upon variation of the angular setting of said windup device with respect to said mandrel.

6. In a bias cutting machine, a cloth support, a mandrel having a longitudinal axis, cutting means positioned adjacent said mandrel for cutting the cloth as it is pulled spirally over said mandrel, means for pulling tubular cloth from said support over said mandrel past said cutting means comprising a windup unit having a windup means for pulling the tubular cloth spirally over said mandrel, said windup unit having a longitudinal axis extending at an acute angle with respect to said longitudinal axis of the mandrel, said unit including a frame, means for supporting said unit adjacent said mandrel comprising a base, pivot means supported by said base, said frame having end members, rollers supported by said end members, and forming part of said windup means, said frame being supported by said pivot means so as to be pivotal about a vertical axis substantially centrally positioned with respect to said end members, and means for moving said windup unit along the longitudinal axis of said windup unit.

7. In a bias cutting machine, a mandrel having a longitudinal axis, a cutting means for cutting the cloth as it is pulled spirally over the mandrel, means for pulling cloth over said mandrel comprising a windup device, said windup device having a longitudinal axis extending at an acute angle to the longitudinal axis of said mandrel, and including means for pulling tubular cloth spirally over the mandrel, support means for supporting said windup device adjacent said mandrel, said windup device being movably supported on said support means for adjustment along the longitudinal axis of said device, and means for moving said windup device along said longitudinal axis of said windup device.

8. In a bias cutting machine, a mandrel having a longitudinal axis, a cutting means positioned adjacent said mandrel for cutting the cloth as it is pulled spirally over the mandrel, means for pulling cloth spirally over said mandrel and past said cutting means comprising a windup unit, said unit having a windup means having a longitudinal axis extending at an acute angle to the longitudinal axis of the mandrel, said unit including a frame supporting said windup means, means for supporting said unit adjacent said mandrel comprising a base, at least one member movably supported by said base and connected to said frame and supporting said frame on said base for movement of said windup means along said longitudinal axis of said windup means.

9. In a bias cutting machine, a mandrel having a longitudinal axis, a cutting means on said mandrel for cutting said material as it is pulled over the mandrel, means for pulling said material spirally over said mandrel past said cutting means comprising a windup unit, said unit having a frame and a longitudinal axis extending at an acute angle with respect to the longitudinal axis of said mandrel and comprising means for pulling tubular cloth spirally over the mandrel, means for supporting said frame adjacent said mandrel comprising a screw member, a nut member threadingly connected to the screw member, said screw member having an axis parallel to the longitudinal axis of said windup unit, a stand, one of the last named members being connected to said stand and the other of said last named members being connected to said frame, and means for rotating said screw with respect to said nut.

References Cited in the file of this patent

UNITED STATES PATENTS

| | | |
|---|---|---|
| 979,752 | Engberg | Dec. 27, 1910 |
| 1,066,304 | Mitchell et al. | July 1, 1913 |
| 1,432,207 | Prior et al. | Oct. 17, 1922 |
| 1,499,924 | Hausheer | July 1, 1924 |
| 1,730,840 | Berry | Oct. 8, 1929 |
| 1,896,596 | Seddon | Feb. 7, 1933 |
| 1,955,282 | Gardner et al. | Apr. 17, 1934 |
| 2,085,835 | Strecker et al. | July 6, 1937 |
| 2,110,856 | Gardner et al. | Mar. 15, 1938 |
| 2,206,580 | Potdevin et al. | July 2, 1940 |
| 2,251,282 | Huizeng | Aug. 5, 1941 |
| 2,305,536 | Langston et al. | Dec. 15, 1942 |